Feb. 21, 1939.  E. W. SMITH  2,147,677
METHOD OF DEAERATING LIQUIDS
Filed Jan. 22, 1936
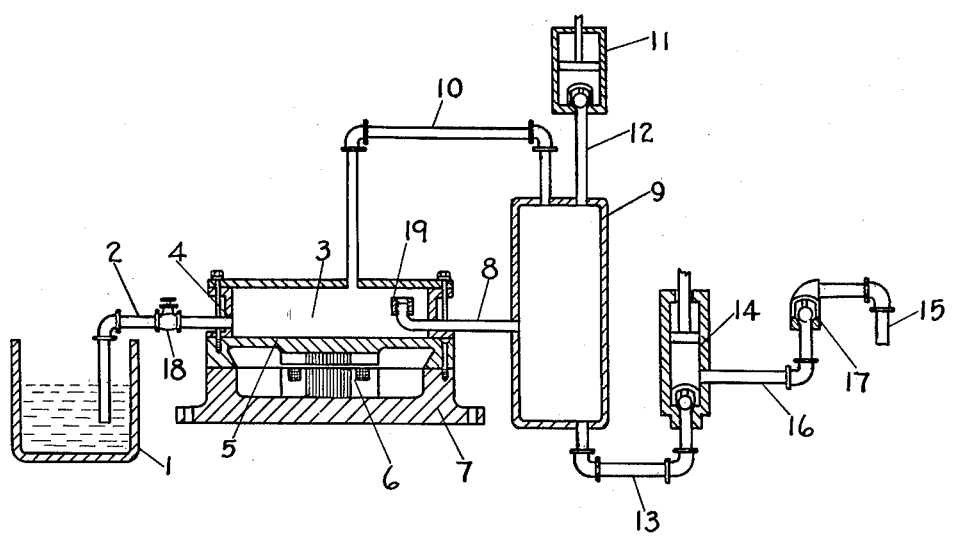
INVENTOR.
EDWARD W. SMITH
BY *Ezekiel Wolf*
ATTORNEY.

Patented Feb. 21, 1939

2,147,677

UNITED STATES PATENT OFFICE 2,147,677

METHOD OF DEAERATING LIQUIDS

Edward W. Smith, Melrose, Mass., assignor to Submarine Signal Company, Boston, Mass., a corporation of Maine Application January 22, 1936, Serial No. 60,286

3 Claims. (Cl. 99—105)

The present invention relates to a method and apparatus for the treatment of liquids and particularly for the deaeration of liquids.

In many instances it is desirable to remove dissolved gas from a liquid. This situation is encountered, for example, in manufacturing processes dealing with viscose or nitro-cellulose solutions. It is also encountered in the preparation and canning of fruit juices, such as orange, grapefruit, pineapple and tomato juices.

Heretofore it has been attempted to remove dissolved gas from liquids by placing the liquid under a vacuum. This process is, however, not wholly satisfactory. It is necessarily very slow since the gas bubbles do not form very rapidly in the liquid, and even though formed, do not readily leave the liquid, even in the presence of a vacuum. The speed of removal of dissolved gas is of particular importance in the deaeration of such liquids as viscose or nitro-cellulose solutions, mentioned above, since the solvents used are very volatile in themselves and in the long period of time which has heretofore been required to remove the dissolved gas by means of an applied vacuum, a large amount of the solvent vapors is carried off. Greater speed in the deaeration of the fruit juices is also desirable since in this case the dissolved gas is largely air which has a tendency to oxidize the fruit juice, spoiling its taste and often its color.

According to the present invention the deaeration of liquids is accomplished by the application of a vacuum to a chamber containing the liquid and at the same time subjecting the liquid to intense compressional wave vibration. The applicant has found that the simultaneous application of compressional wave vibration to the liquid while in a chamber which is under a vacuum is extraordinarily successful in rapidly removing dissolved gas. Furthermore, in the case of fruit juices the applicant has found that the compressional wave vibration not only increases the speed of deaeration but also simultaneously assists in dispersing the cellular structure in the juices and thus discourages any tendency for this fibrous material to separate out after canning.

The present invention further provides a continuous system for deaerating liquids. Such a system is shown in the drawing.

The material to be treated is initially placed in a tank 1 from which the pipe 2 leads through the flow-controlling valve 18 to the vibration chamber 3. The chamber 3 is made up of a cylindrical shell 4 which is mounted upon the diaphragm 5 which may be set into intense vibration by means of the electromagnet 6. The electromagnet 6 is mounted within a cup-shaped casing 7 closed at the top by the diaphragm 5. The chamber 3 is connected to the tank 9 by the pipes 8 and 10. The pipe 8 serves to conduct liquid out of the vibration chamber and its end within the chamber is extended upwardly and surrounded by an adjustable sleeve 19 whereby the liquid level in the chamber can be regulated. A vacuum pump 11 is connected to the tank 9 by the pipe 12. The lower portion of the tank 9 is connected by means of the pipe 13 to the pump 14, the latter being connected to an outlet 15 through the pipe 16 and the valve 17.

The operation of the system is as follows: The vacuum pump 11 maintains a vacuum in the tank 9 and consequently in the vibration chamber 3. The liquid from the tank 1 is, therefore, drawn up through the pipe 2 into the vibration chamber 3. In this chamber the liquid is subjected to intense compressional wave vibration produced by the diaphragm 5. As the liquid level in the chamber 3 increases to the level of the outlet as determined by the height of the sleeve 19, it will begin to flow through the pipe 8 and into the chamber 9.

The level of the liquid being treated in the vibration chamber 3 should be adjusted in accordance with the characteristics of the liquid. In general, a rather thin layer of liquid will be found to be most satisfactory, and viscous liquids are preferably treated in a thinner layer than freely flowing liquids.

All gases which are evolved from the liquid in the chamber 3 are immediately removed through the pipe 10 leading to the tank 9 from which they are removed by the vacuum pump 11. The liquid which has been treated thus gradually all passes into the chamber 9 from the bottom of which it is continually abstracted by the pump 14 which forces it through the pipe 16 and the valve 17 to the outlet 15.

By the deaeration of a liquid I mean the removal of dissolved gas of whatever nature from the liquid.

Having now described my invention, I claim:

1. Method of deaerating liquids which comprises flowing the liquid in a thin layer over a surface in a chamber at less than atmospheric pressure and simultaneously rapidly vibrating the said surface.

2. Method of deaerating liquids which comprises flowing the liquid into a chamber having a bottom surface vibrated with intense compressional waves, maintaining a pressure less than atmospheric pressure in the chamber over the surface of the liquid and withdrawing the liquid from a point near the top surface of the liquid where the pressure is maintained below atmospheric pressure.

3. Method of deaerating liquids which comprises flowing the liquid into a chamber formed with a flat horizontal surface as the bottom of the chamber, vibrating the surface continually as the liquid is flowing over it, withdrawing the liquid from a point near the top surface of the liquid and simultaneously maintaining the top surface of the liquid at a pressure lower than atmospheric pressure.

EDWARD W. SMITH.